Feb. 26, 1957    E. H. WALLACE    2,782,830
PNEUMATIC TIRE
Filed July 15, 1953
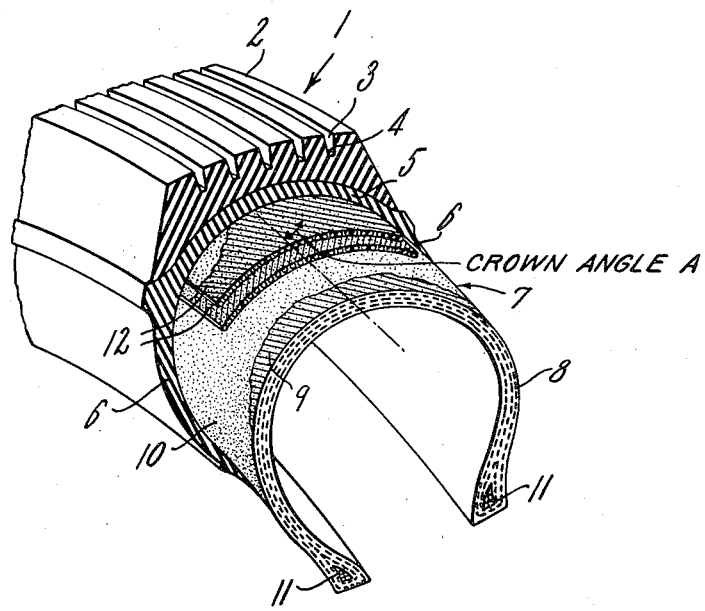
INVENTOR.
EDWARD H. WALLACE
BY James J. Long
AGENT

United States Patent Office 2,782,830
Patented Feb. 26, 1957

2,782,830
PNEUMATIC TIRE

Edward H. Wallace, Grosse Pointe, Mich., assignor to United States Rubber Company, New York, N. Y., a corporation of New Jersey Application July 15, 1953, Serial No. 368,113

1 Claim. (Cl. 152—355)

This invention relates to an improved pneumatic tire, and, more particularly, it relates to a pneumatic tire embodying nylon textile elements as the principal carcass reinforcement.

It has previously been known to build pneumatic tires with a carcass comprised of nylon textile elements, usually in the form of cords. Although the tire carcass based on nylon cords had certain advantages consequent to the great strength and unusual resistance to deterioration of the nylon, it was found that the use of nylon was also accompanied by definite disadvantages. Thus, tires reinforced with nylon cord were not as stable as corresponding constructions made with cotton or rayon cords. Perhaps an even more serious disadvantage was the fact that nylon-reinforced tires were especially subject to "growth," that is, they tended to gradually increase in size with use, and such growth was evidenced particularly in a tendency to formation of cracks in the bases of the tread grooves. This groove-cracking was not only unsightly, but it greatly weakened the structure of the tire and led to premature failure that often occurred suddenly and without warning, to the peril of the occupants of the vehicle on which the nylon tire was being used. In addition, the growth of nylon tires caused any minor cuts accidentally produced in the bottoms of the grooves to extend into large cracks of serious proportions.

It is another disadvantageous propery of nylon in inflated tires to act somewhat like a drum head and transmit to the car to an undesirable extent the vibrations set up in the tire by impact with irregularities in the road. In fact, the noise transmitted by nylon passenger tires operating on a brick pavement has been rated as unsatisfactory from a customer acceptance point of view.

For years skilled research workers and tire engineers therefore devoted themselves to seeking ways and means whereby the foregoing disadvantages of the nylon-reinforced tire could be overcome, without compromising the advantageous features of nylon. However, the proposed solutions to this problem have been only moderately successful. For example, a certain expedient for increasing stability, namely, lowering the cord angle of the nylon, unfortunately merely aggravated the groove-cracking problem.

Another expedient has been to increase the number of plies of nylon fabric in the carcass, but this has been only moderately successful and it is uneconomical, and has the further disadvantage of making the tire undesirably thicker and heavier, so that it becomes considerably hotter than usual in use, with consequent accelerated deterioration of the tire.

For these reasons, the nylon-reinforced tire has not been as generally adopted, especially for passenger car size tires, as the inherent advantages of nylon would lead one to anticipate that it should be adopted.

Accordingly, it is a principal object of the present invention to provide an improved pneumatic tire with a nylon-reinforced carcass, that is stable in operation and also acceptable from the standpoint of freedom from groove-cracking, as well as improved from the standpoint of noise transmission characteristics.

Additional objects and advantages will be made evident in the following detailed description of the invention, which is intended to be read with reference to the accompanying drawing, the single figure of which is a fragmentary perspective view, with portions broken away, of a tire constructed in accordance with the invention.

The invention provides a pneumatic tire 1, comprising the usual vulcanized rubber tread portion 2, having in its surface tread grooves 3 in the form of a desired anti-skid pattern, such grooves extending inwardly from the surface of the tread to a definite depth at their bases 4. Underneath the tread 2 there is usually provided a subtread portion 5 which may be made of a different kind of rubber stock than the tread, and contiguous at either side of the crown of the tire with laterally and downwardly extending sidewall portions 6 composed of a softer, more flexible rubber stock than the tread, which is relatively harder and more abrasion resistant.

Beneath the sidewall and undertread portions is the carcass 7 constituting the body that imparts strength to the tire. The carcass is made up of a plurality of layers or plies of superimposed rubberized tire fabric 8, that become firmly adhered to each other and to the outer rubber covering of the tire during the process of vulcanization.

The tire fabric is made up of a multiplicity of adjacent nylon cords 9, constituting a cord fabric that may either be devoid of any transverse or weft cords, or that contains only an occasional weft cord to maintain the general arrangement of the fabric during processing. As is understood by those skilled in the art, the tire fabric is made by passing a large number of cords in parallel relation through an adhesive bath, usually made up of a mixture of latex and a resorcinol-formaldehyde resin. The thus-solutioned cords are dried and cured at elevated temperature, still in parallel side-by-side relation, following which they are passed through a calender that applies a thin friction coat 10 of rubber carcass stock to each side of the cord fabric in the form of a thin skin.

Before assembly into the tire the tire fabric is cut on a bias to provide strips of fabric of the proper length and width, in which the cords run from one side of the fabric piece to the other on a bias at a definite predetermined angle. The bias-cut fabric is then laid on the usual tire building drum (not shown) and the conventional inextensible bead assemblies 11, typically made up of rubber covered wire wrapped in strips of rubberized fabric, are incorporated in the marginal edges of the carcass by folding the edges of the fabric plies over such assemblies. Thereafter the tread and sidewall rubber is applied and the completed assembly is vulcanized in tire shape under heat and pressure.

An essential feature of the invention comprises incorporating under the tread portion of the tire and over the crown portion of the carcass at least one layer 12 of rayon tire fabric, such additional layer or ply being known as a breaker strip or shock pad. The breaker strip or shock pad is only sufficiently wide to cover the crown portion of the carcass. The breaker strip extends beyond the bases of the outermost grooves in the tread and to a point on the carcass line approximately under the shoulder of the tread. Such breaker strip is prepared of rubberized rayon tire fabric in essentially the same manner as described previously in connection with the nylon carcass fabric. The breaker fabric typically has a smaller end count than the carcass fabric, say 22 ends per inch, as opposed to 30 or 35 ends per inch for the carcass fabric. The rayon breaker fabric is also cut on a bias, to provide a definite cord angle in the final tire.

For purposes of the invention the cords constituting the breaker strip should have a stretch of from 5% to 8%, and preferably 6%, under a ten-pound load, as measured under standard conditions in accordance with the American Society of Testing Materials standard test designated 885-46T. This compares to a 10 pound stretch value of from 10% to 15%, and preferably 13%, for the nylon cords (actually usually plied yarns) of the carcass.

The breaker strip is incorporated in the tire assembly by laying the cut strip circumferentially on the central portion of the fabric carcass on the tire building drum before application of the tread. Under the influence of the subsequently applied heat and pressure the rubber covering of the upper surface of the breaker ply adheres firmly to the underside of the tread, while the rubber covering on the under surface of the breaker fabric similarly mergers with the rubber stock on the upper surface of the top carcass ply.

The completed tire of the invention is constituted of a nylon cord carcass based on a cord angle in the range of from 30° to 40°, and preferably in the range of from 33° to 36°, with a rayon breaker ply having a cord angle of from 1 to 3° higher, preferably about 2° higher. It will be understood that in the final tire the cord angles will vary somewhat from the value of the cord angle in the fabric as initially cut, due to the distortion that takes place as the tire is shaped. The cord angle in the finished tire is generally designated at the crown, is indicated by the angle "A" in the drawing. The cord angle may thus be defined as the lesser angle the cord makes with the circumferential center line of the crown portion of the tire.

In practicing the invention, I usually use two superimposed breaker strips, and I usually so dispose them that the cords in each strip run in opposite directions, for a more balanced construction. However, even a single rayon breaker strip constructed as specified is sufficient under ordinary circumstances and produces a remarkably improved result compared to previously known nylon tires.

Another fundamental characteristic of the invention is that it employs, as the textile reinforcement in the main carcass or body plies, cords (plied yarn) composed of nylon, which has a low modulus of elasticity, generally within the range of from about 2 to $5 \times 10^{10}$ dynes/cm.$^2$ (as measured by the static method at 20° C. and 65% relative humidity), and which ordinarily leads to a tire having excessive growth and other disadvantages, as explained previously. In the invention these disadvantages are overcome by employing, in combination with the nylon carcass, one or more breaker plies or shock pads based on a material with a high modulus of elasticity, preferably within the range of from about 8 to $25 \times 10^{10}$ dynes/cm.$^2$ or even higher, if desired.

The superiority of the tire constructed in accordance with the invention was demonstrated by actually testing such a tire having a crown cord angle of 33° in the carcass and two rayon shock pads of the kind described with a cord angle of 35°, in comparison with two other nylon tires having similar cord angles in the body, but having nylon shock pads in place of rayon. In one such other tire the cord angle of the nylon shock pads was 33°, while in the remaining tire the nylon shock pads had a cord angle of 50°. After running all three tires on a test wheel until such time as the grooves developed cracks, the amount of cracking was determined by carefully measuring the exact total area of all of the cracks in the bases of the grooves. Both of the tires with nylon shock pads developed five to six times as much cracking as the tire of the invention.

In fact, the nylon tire made in accordance with the invention was so good from the standpoint of groove-cracking that it was actually as good as, if not indeed superior to, a conventional all-rayon tire of otherwise similar construction, by actual comparisons made on test wheels under carefully controlled conditions.

Furthermore, actual road tests have revealed that the tire of the invention is comparable in resistance to growth to a conventional all-rayon tire, as evidenced by the fact that tread width measurements made after road-testing the tires for a definite period of time showed no more increase for the tire of the invention than for the all-rayon tire used as a standard. The significance of this will be particularly appreciated when it is realized that nylon tires have heretofore generally been definitely inferior to rayon tires from the standpoint of growth. The tire of the invention therefore so exceeded conventional nylon tires in this regard that it was actually comparable to an all-rayon tire.

Not the least significant improvement observed in tires embodying the invention was the fact that they definitely transmitted less road noise, and they performed unusually well in this respect where conventional nylon tires were quite unacceptable.

Having thus described my invention, what I claim and desire to protect by Letters Patent is:

A pneumatic tire comprising in combination vulcanized rubber grooved tread and sidewall portions, an underlying carcass of rubberized tire fabric consisting of nylon cords disposed at a cord angle of from 30° to 40° and having a ten pound stretch of from 10% to 15%, and a breaker strip consisting of rayon cords disposed at a cord angle from 1° to 3° higher than the angle of said carcass cords and having a ten pound stretch of from 5% to 8%, interposed between said tread and carcass, the cord angle being defined as the lesser angle the cord makes with the circumferential center line of the crown portion of the tire.

References Cited in the file of this patent

UNITED STATES PATENTS

| 1,493,674 | Hopkinson | May 13, 1924 |
| 2,432,630 | Purdy | Dec. 16, 1947 |
| 2,498,859 | Lessig | Feb. 28, 1950 |

FOREIGN PATENTS

| 108,715 | Australia | Oct. 19, 1939 |
| 508,165 | Belgium | Jan. 15, 1952 |

(Corresponding Great Britain 700,435, Dec. 2, 1953)

| 649,819 | Great Britain | Jan. 31, 1951 |